United States Patent [19]
Goodnight
[11] 4,340,948
[45] Jul. 20, 1982

[54] SINGLE-COIL BALANCE WHEEL FOR DRIVING A MECHANICAL MOVEMENT

[75] Inventor: John W. Goodnight, Kannapolis, N.C.
[73] Assignee: General Time Corporation, Thomaston, Conn.

[21] Appl. No.: 143,291
[22] Filed: Apr. 24, 1980
[51] Int. Cl.3 .................... G06F 1/04; H02K 33/10
[52] U.S. Cl. .................... 368/158; 368/161; 318/127
[58] Field of Search .............. 368/158, 161, 162, 163; 318/127, 129, 131, 130; 331/116 R

[56] References Cited

U.S. PATENT DOCUMENTS 3,046,460 7/1962 Zemla .................... 368/158 X
3,618,311 11/1971 Wiesner et al. ............ 318/130 X
3,787,715 1/1974 Eaton, Jr. ................ 368/162 X
3,806,781 4/1974 Berney .................... 368/158 X
3,921,386 11/1975 Keller .................... 368/161
3,952,497 4/1976 Schulz et al. .............. 368/158

*Primary Examiner*—Vit W. Miska
*Attorney, Agent, or Firm*—Pennie & Edmonds

[57] ABSTRACT

A timepiece including a mechanical movement is disclosed and a movable system for driving the movement. The movable system includes a balance wheel formed by a pair of plates and a magnetic member mounted on each plate. The magnetic members include a magnetic north and south pole arranged to provide a magnetic field. A coil is disposed in position so that its winding may be swept with the magnetic field which induces a voltage to which a circuit is responsive to develop a feedback signal to be applied across the winding to add energy to the movable system in replacement of energy losses of friction, and so forth. A feedback signal is developed if the movable system is sweeping the coil briskly. If movement of the movable system is not brisk, or the movable system has stopped, then a start pulse is developed for self-starting. The start pulse is normally prevented by the feedback signal which also serves as a reset signal to reset a start signal counter before completion of a counting operation. The circuit is controlled by an oscillator which opens and closes a gate to prevent creation of a closed loop.

14 Claims, 13 Drawing Figures

SINGLE-COIL BALANCE WHEEL FOR DRIVING A MECHANICAL MOVEMENT

TECHNICAL FIELD

The present invention is directed to a single-coil balance wheel structure for driving a mechanical movement of a timepiece and to an electronic circuit for maintaining the oscillatory movement of the balance wheel at least at a minimum prescribed rate.

BACKGROUND ART

Heretofore, most transistorized movements of the balance wheel type have included a pair of coils, one coil serving as a pick-up coil and the other coil serving as a drive coil. U.S. Pat. Nos. 2,986,683 and 3,168,690 to M. J. Lavet et al. are typical. In such movements, the pick-up coil is connected to the input circuit of a transistor while the drive coil is connected to the output circuit of the same transistor. A pair of magnets are mounted on a balance wheel structure in a manner to provide a magnetic field to which both the pick-up coil and the drive coil respond. In this connection, the magnets move with the balance wheel in an oscillatory back and forth motion to induce a voltage in a winding of the coil. The effect of this operation is that the transistor is switched on as it responds to the voltage induced in the winding and that voltage is amplified at the output of the transistor and impressed across the winding of the drive coil in synchronism with the voltage induced in the winding of the pick-up coil to add energy to the system. This action maintains a sweeping oscillatory movement of the balance wheel.

Analog type positive feedback systems functioning to replace energy removed from a movable balance wheel system tend to self-oscillate. In order to avoid the tendency of self-oscillation, the prior art circuits have been highly damped and the feedback has been closely controlled. Such damping and control necessitate specific and tight component values which normally cannot be placed on an integrated chip. Additionally, these known prior art feedback systems including feedback circuits are subject to temperature variations which tend to change threshold chracteristics, for example, of the applied voltage, as well as current and temperature parameters. Moreover, time constants must be carefully chosen in order to avoid an adverse effect on timekeeping.

The prior art also includes other types of circuits employing synchronized blocking oscillators or multivibrators for purposes of overcoming the aforementioned adverse effects. However, these circuits require components which are relatively large and not practicable in use in small scale integration. With regard to these circuits, it again is necessary to carefully choose circuit time constants so as not to influence, but rather to minimize their effect on timekeeping.

It is a primary aspect of the present invention to provide a system in which a single-coil balance wheel operation may be obtained using readily integratable components and standard integration techniques. The circuit of the present invention is comparatively immune to timekeeping variations due to temperature, current, and voltage variation. Further, there are no circuit time constraints which must be carefully controlled or chosen to avoid an influence upon timekeeping, and the required electronics of the circuit are contained completely on a single integrated chip. Finally, the circuit design is such that the balance wheel and the balance wheel alone regulates timekeeping.

DISCLOSURE OF THE INVENTION

The present invention is in a system for use with a timepiece for driving a mechanical movement. The system includes a single-coil serving both as a pick-up coil and a drive coil, a movable oscillatory system and a circuit which develops a feedback signal to be impressed across the coil to add energy to the movable system and sustain oscillation. The movable system includes a balance wheel formed either by one or a pair of plates and either one or a pair of magnetic members supported on a respective plate. Each magnetic member provides a magnetic north pole and a magnetic south pole and the support of each magnetic member on a plate is such that a magnetic field is created from a north pole to a south pole. The magnetic field will be from a north pole of one magnetic member to the south pole of the other magnetic member in an embodiment including a pair of magnetic members and plates. The movable system is arranged for rotational movement about an axis disposed adjacent the coil and parallel to the axis of its core. In movement, each magnetic member sweeps back and forth across a face of the coil from a position approaching one outer edge, through the core, to a position beyond the other outer edge of the winding for purposes of inducing a voltage in the winding upon each back and forth sweeping movement. A circuit is connected to the coil by means of an input amplifier. The input amplifier has an output in response to the sensing of at least a portion of a cycle of induced voltage. The circuit is also connected to the coil by an output amplifier and the circuit includes operative electronic elements connecting the input and output amplifiers for generating a feedback signal at the output amplifier substantially in synchronism with the induced voltage to which the input amplifier responds. The feedback signal is impressed across the winding to add energy to the movable system during that time that the balance wheel and each magnetic member is sweeping the coil at least at a minimum prescribed rate of movement. As an important aspect of the invention, the circuit includes a gate, a memory device and a source of output oscillation which controls both the gate and memory device to connect and disconnect the input and output amplifiers to prevent formation of a closed loop feedback system and properly "load" the memory device to store information indicative of the output of the input amplifier.

The invention will be described further as the description to be read in conjunction with a view to the drawing continues.

BEST MODE FOR CARRYING OUT THE INVENTION

The present invention is directed to a single-coil balance wheel structure for driving a mechanical movement of a timepiece.

Figure 1A:
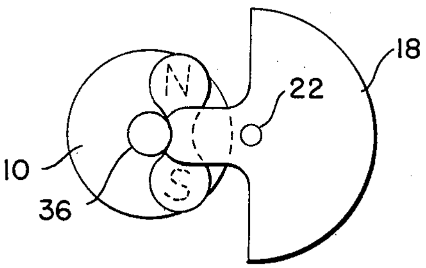
FIGS. 1A and 1B are schematic representations, in plan and elevation, respectively, of a coil, balance wheel and magnets, the latter Figure also illustrating a fragmentary portion of a mechanical movement of a timepiece.
Figure 1B:
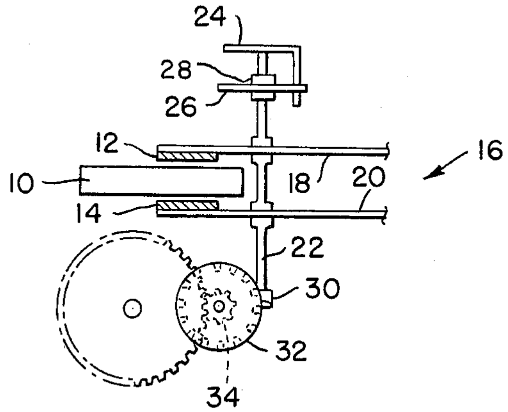

Referring to FIGS. 1A and 1B, there is illustrated an electromagnetic system including a coil 10 comprised of a single winding and either one, but preferably a pair of magnets 12, 14 mounted to sweep across opposite faces of the coil thereby to induce a voltage across the winding. A balance wheel 16 includes either one or a pair of plate elements 18, 20 which are mounted on a spindle 22. Each end of the spindle is supported for movement in a bearing 24 (only one is shown) which may comprise a portion of the frame of the timepiece, and each plate element is fixed on the spindle by any means which may be conventional in the art. To this end, each plate element may be mounted through the agency of a friction mount or it may be keyed or otherwise mounted on the spindle. Magnet 12 may be carried by plate element 18 and magnet 14 may be carried by plate element 20 in spaced relation to the former (see FIG. 1B). The location of the magnets relative to coil 10 may be seen in FIGS. 1A and 1B.

The magnets 12, 14 which either are permanent magnets or formed of a permanently magnetizable material generally may take the shape of a dumbbell. The magnets include a north (N) pole at one end and a south (S) pole at the other end. The two magnets are oriented in the operative embodiment to provide a D.C. flux path from the N pole of one magnet to the S pole of the other magnet, and are spaced from the face of coil 10 through a distance as determined by those characteristics as are well known in the art. The polar arrangement of the magnets may be seen in FIG. 1A.

A balance spring 26 is carried by the spindle 22. As may be appreciated, the spring constant of spring 26 and the mass of the balance wheel will determine the period or frequency of movement. Preferably, one end of the spring may be fixed to a collet 28 which, in turn, is fixed to spindle 22 and the end of the outer convolution of the spring may be fixed to a portion of the frame. The spring constant may be adjusted in a conventional manner to adjust the frequency of movement of the balance wheel.

A gear 30 is carried by the spindle 22 and provides the input to a mechanical movement including a gear 32. As may be seen perhaps to best advantage in FIG. 1B, a gear 30 is formed to provide a gear tooth in the outline of a helix throughout substantially a full revolution. A lobe is formed along the lower surface of the gear tooth within each region adjacent the discontinuity for driving interaction with gear 32. Gear 32 is fixedly supported on axle 34 whose axis is disposed in a plane perpendicular to the axis of spindle 22. Gear 32 carries a plurality of pins (not shown) in a concentric circle projecting toward gear 30. Thus, as the magnets 12, 14 sweeps across the face of coil 10 in one direction and the spindle, in turn, follows this movement through some rotational angle, one lobe of gear 30 at one side of the discontinuity strikes a pin to move gear 32 through a small angular movement (illustrated by the arrow) and as the spindle follows movement of the magnets in the opposite direction, the lobe on the other side of the discontinuity strikes the same pin to move the gear through an additional angle of movement. This driving movement continues as the magnets continue to sweep back and forth and the respective lobes strike the next and each following pin on gear 32.

Figure 2A:
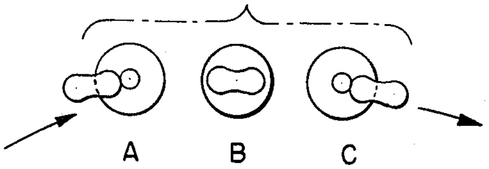
FIGS. 2A and 2B are fragmentary plan views of a portion of the structure of FIGS. 1A and 1B illustrating oscillatory movement of the magnets relative to the coil.
Figure 2B:
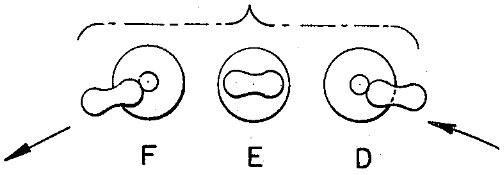
Figure 3:
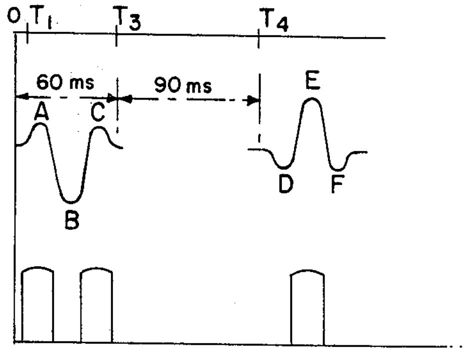
FIG. 3 illustrates, relative to a time line, a voltage induced across the coil during movement of the magnets within a cycle of movement and an additive feedback voltage.

As the magnets 12, 14 sweep back and forth across the face of coil 10, a voltage is induced across the winding. The wave pattern generally follows the pattern seen in FIG. 3. Referring to FIGS. 2A, 2B and 3, it will be observed that as the leading magnetic field approaches the coil, a positive going voltage is induced across the winding which shall increase from zero volts to a positive value, peak A, and then decrease toward zero as the leading magnetic field approaches the central region of coil 10 comprising an open air core 36 from a position approximately half-way between the edge of the coil and the core. Peak A is measured approximately at the half-way position between the edge and the core of coil 10. The particular position of the leading magnetic field relative to the coil and the value of the induced voltage across the winding at any time may be appreciated through comparison of FIGS. 2A, 2B on the one hand and FIG. 3 on the other. As the magnets continue their sweeping movement, the leading magnetic field moves from the core of coil 10 to the outside edge, and the trailing magnetic field moves from the outside edge toward the core. Since the leading and trailing magnetic fields are oppositely oriented, the induced voltage, peak B, is additive and greater, in a negative sense, than the voltage measured at peak A. The value of peak B is measured when the poles of the magnets are centered relative to the winding of the coil. Further sweeping movement, such that the leading magnetic field moves beyond the outside edge of the coil and the trailing magnetic field moves to a position between the core and the outside edge, results in a positive going voltage to a peak, peak C, having a value similar to that of peak A. In this movement, the leading magnetic field will have little or no effect on the induced voltage. As the sweeping movement continues, the trailing magnetic field will move beyond the outside edge of the coil and the induced voltage will drop to zero volts. The value of the induced voltage at peaks A and C (and hereinafter referred to peaks D and F) may be about $\pm 0.3$ volts. The value of the induced voltage at peak B (and the hereinafter referred to peak E) may be about $\pm 0.5$ volts. These values are set out for illustrative purposes, only.

A second pulse will be induced in the winding of the coil as the magnets follow a return sweeping movement across the face. Since the direction of movement is reversed, the voltage induced in the coil, as illustrated by peaks D, E and F, will be reversed, also.

A first and second pulse of repeated pulses induced in the winding of coil 10 is illustrated in FIG. 3. As illustrated, the pulse increases from zero volts at some point in time, $T_1$, which may be a few milliseconds after time, $T_0$, the time the leading magnetic field commences movement toward the outside edge of the coil. The first pulse will last throughout a period of about $T_3$–$T_1$, which for illustrative purposes may be about 60 milliseconds, and the second pulse may begin at some point in time, $T_4$, thereafter. The interval or gap between pulses corresponds to the interval of time during which the then trailing magnetic field (during the next pulse, and thereafter, the trailing magnetic field becomes the leading magnetic field) is beyond the coil. The interval is the result of inertia of the movable system including the balance wheel 16 and magnets 12, 14.

If the balance wheel is to continue in sweeping movement throughout repeated cycles, it will be necessary to impress a feedback voltage across the winding of coil 10 thereby to add energy to the system. The manner and means of creating of a feedback voltage which shall be impressed across the winding without development of a closed loop now will be described.

Figure 4:
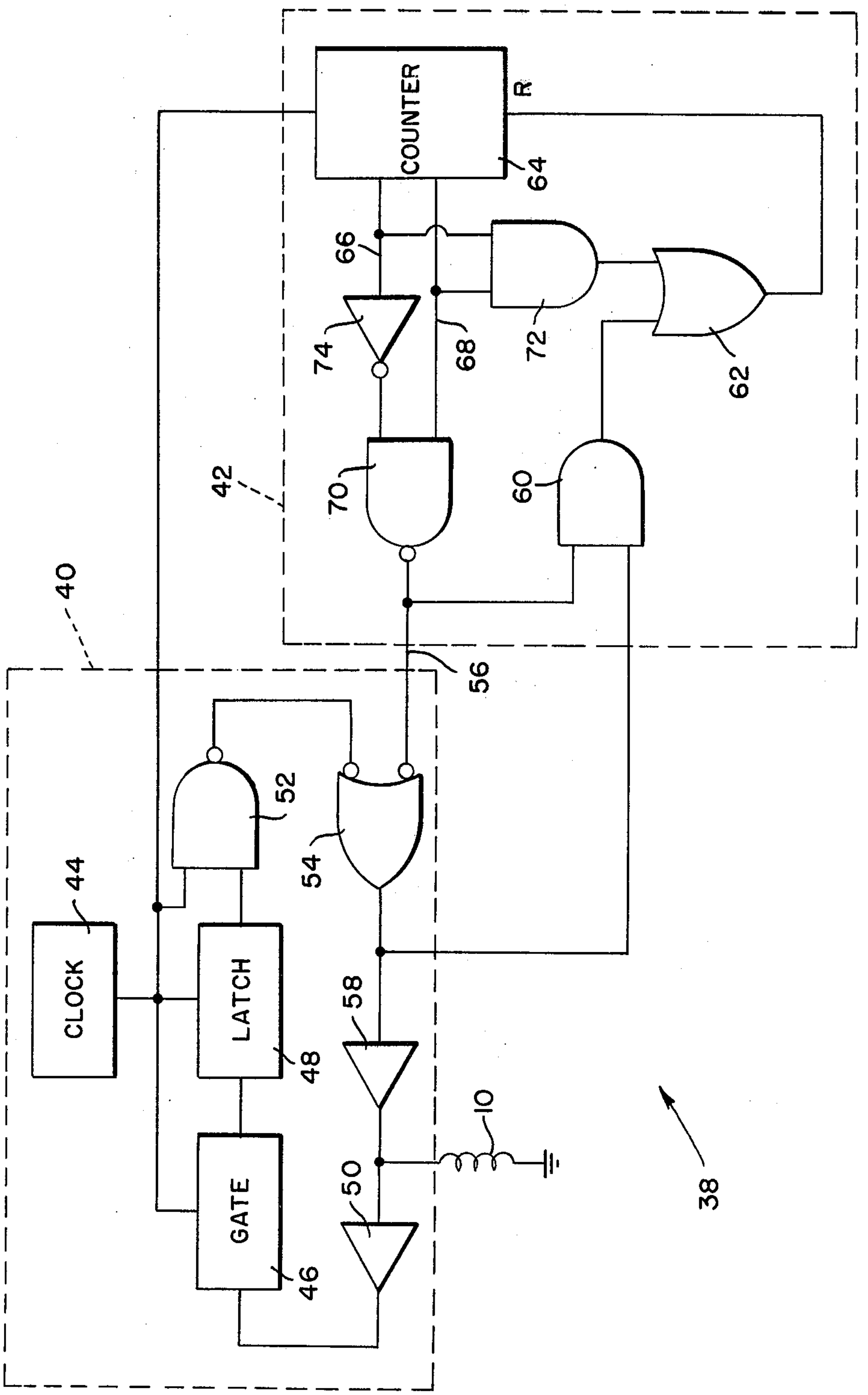
FIG. 4 is an operational block and logic diagram of the circuit of the present invention.

Referring to FIG. 4, there is illustrated a circuit 38 which is comparatively immune to timekeeping variations, and one which functions without circuit time constants requiring careful control or the requirement of careful choice of components to avoid any influence on timekeeping. The circuit functions to detect a voltage induced across the winding of coil 10, and provide an output in the form of positive feedback voltage to reinforce the induced voltage. The feedback voltage is added to the balance wheel magnetically to tend to repel the magnets in the direction of movement thereby to replace the energy withdrawn or lost from the system due to mechanical reasons. The circuit design is such that the balance wheel and the balance wheel alone regulates timekeeping.

The circuit 38 includes a drive portion 40 included within the dash line to which the lead line is directed and a pulse portion 42, likewise included within the dash line to which its lead line is directed. The drive portion functions to develop the positive feedback voltage which is added to the balance wheel magnetically during the period of time that there is brisk movement of the balance wheel. The positive feedback voltage, additionally, comprises a signal to provide a reset voltage to disable operation of the pulse portion of the circuit. This will be discussed below. If the balance wheel either is immobile or not moving with necessary briskness to develop the feedback voltage, then the pulse portion of the circuit will be operative to generate a start signal either to self-start the balance wheel or bring it to proper speed in sweeping movement. Thus, the balance wheel will suitably drive the mechanical movement uni-directionally.

The heart of the drive portion is a clock 44, a transmission gate 46 and a data latch 48. The clock is comprised of a free-running oscillator having an output frequency which is equal to at least twice the frequency of movement of the balance wheel when the movement is brisk. In a preferred embodiment of the invention, the output frequency is 1 KHz. The clock controls the operation of both the transmission gate and data latch in a manner to prevent formation of a closed loop. Accordingly, the instabilities of a closed loop are avoided.

A comparator 50, which is a high-gain amplifier, is located at the input of circuit 38 for purposes of comparison of the value of induced voltage (FIG. 3) with some threshold voltage. In an operative embodiment of the invention, a threshold voltage of from about 0.060 to about 0.070 volts has been used successfully. If the input voltage to be compared is less than the threshold voltage, then the output of comparator 50 is at ground potential. On the other hand, if the induced voltage to be compared has risen to a value which is equal to or greater than the threshold voltage, then the output of the comparator will go to +V supply. Thus, the output of comparator 50 will either be "low" or "high." In the present embodiment of the invention, the circuit is supplied power by a battery, such as a standard C-cell ($1\frac{1}{2}$ volts).

Figure 5:
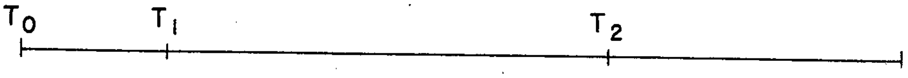
FIG. 5 is a time line.
Figure 6:
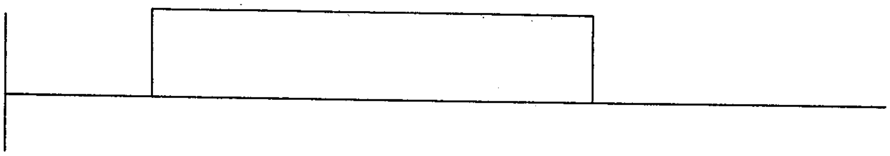
FIGS. 6–11 represent the output wave forms of several of the components of the circuit of FIG. 4 relative to the time line of FIG. 5.

Operation of the circuit 38 may be better appreciated through reference to the several wave forms of FIGS. 6–11, each of which is related to the time line in FIG. 5. At approximately time $T_1$, the comparator output will go high thereby to respond to an induced voltage at peak A (FIG. 3) which is at least equal to the threshold voltage. The voltage will remain high during the period of $T_2$–$T_1$ and then as the induced voltage drops below the threshold voltage, the comparator voltage will go low. The period of time, $T_2$–$T_1$, may be about 15 ms if one pulse is about 60 ms. These time periods, however, are only set out for illustrative purposes and not in a limiting sense. The time $T_1$–$T_0$ may be indicative of that time required for the balance wheel and the supported magnets to move relative to the coil so that the leading magnetic field will induce a voltage, as well as the time for that induced voltage to rise to a value equal to the threshold voltage.

Figure 7:
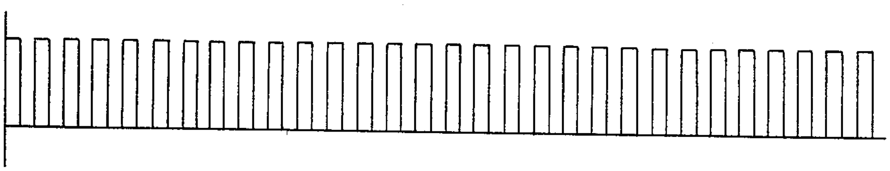
Figure 8:
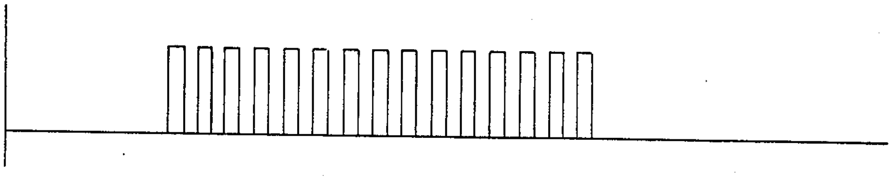

The output cycle of clock 44 may be seen in FIG. 7 as a series of pulses which are first high and then low at a frequency of 1 KHz. Transmission gate 46 is controlled by the clock output to pass the voltage output of comparator 50 when the output of the clock is low. The output of the transmission gate, see FIG. 8, is then "loaded" into the data latch 48 comprising a memory device.

When the output of clock 44 is high, see FIG. 7, the transmission gate 46 is "open" to block the voltage output of comparator 50. The coil, therefore, is disconnected from the input to the circuit. Thus, the drive or feedback signal to reinforce the induced voltage and sustain movement of the balance wheel is derived from the contents of the data latch 48.

This sequence of events is repeated once during every output cycle of clock 44 which, as may be appreciated, occurs at a much greater rate than that of a cycle of balance wheel 16. Thus, during one-half of the clock cycle, the coil acts as a sense coil and during the other one-half of the clock cycle the coil acts as a drive coil. This described sample and store technique permits a single coil to function both as a sensing coil and a driving coil without introduction of those complexities and stability problems arising through implementation of a closed loop system.

Figure 9:
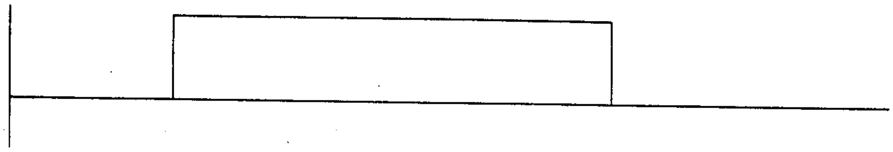
Figure 10:
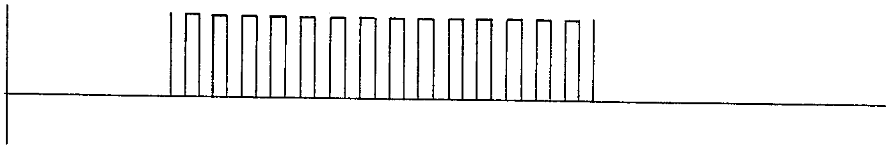
Figure 11:
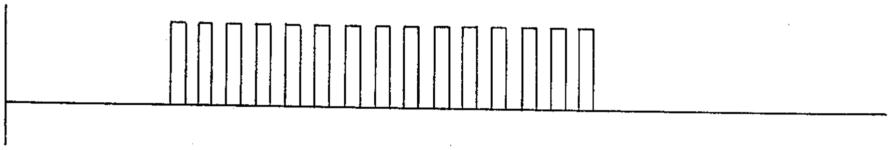

The output of data latch 48 may be seen in FIG. 9. The output substantially duplicates the output of comparator 50 (see FIG. 6). As may be appreciated, the data latch is "loaded" in response to an output of transmission gate 46 when the output of clock 44 is low. Thus, the data latch remembers a high output of the transmission gate and thereby provides a high output until such time as both the input of the transmission gate and clock go low. The output of the data latch and clock provide the inputs at the two control inputs of NAND gate 52. The output of the NAND gate may be seen in FIG. 10. Thus, during the period of time that the output from the data latch is low, the output of the NAND gate is high. The outputs remains high until that time at which a high imput from each of the data latch and clock is connected at the control inputs. Thereafter, for the period that the output of the data latch is high, the output of the NAND gate will go high when the clock output goes low, and vice versa. The output of the NAND gate again returns to a high when the data latch output goes low.

The output of NAND gate 52 is connected to one control input terminal of OR gate 54. A signal, on line 56, derived from the portion 42 of circuit 38 is connected at the other control input terminal. This signal either may be a constant high or in the form of a start signal depending upon whether the balance wheel 16 and magnets 12, 12 are briskly sweeping across the winding of coil 10. By "brisk," it is meant that the sweeping movement induces a voltage across the winding of coil 10 which exceeds the threshold voltage of comparator 50 and prevents the generation of a start signal, as will be described.

If the motion of the balance wheel is brisk enough, then the signal along line 56 will be high. That signal and the output of NAND gate 52 are inverted at the control inputs of OR gate 54 so that the output of the gate follows the wave pattern of FIG. 11. An amplifier 58 is connected to OR gate 54. The amplifier, in turn, is connected to coil 10 to impress the amplified voltage across the coil. By applying the amplified voltage across the winding of coil 10 is synchronism with the voltage induced in the coil by the moving magnetic field of magnets 12, 14 on balance wheel 16, movement of balance wheel will be maintained by the voltage reinforcement to replace and satisfy energy losses.

The output of OR gate 54 serves as one control input, i.e., a reset pulse, to AND gate 60. During the time that the balance wheel is sweeping the coil in the aforementioned brisk fashion, in other control input to AND gate 60 will comprise the signal along line 56. When both control inputs are high, the AND gate will provide an output to one control input of OR gate 62. At this time, and as will be described, the input at the other control is low thereby to reset counter 64 upon each reset signal. The reset signals occur at a frequency of at least one pulse per second (1 p/sec) and, preferably at a frequency of about 2–3 p/sec. The frequency of the reset pulses prevents completion of a counting operation whereby the counter will have counted a sufficient number of pulses from clock 44 to produce an output along both lines 66, 68. Therefore, the counter will be continually reset by reset signal and the signal along line 56 will remain high.

If, however, and as previously discussed, motion of balance wheel 16 is insufficient to provide a reset voltage, then the counter 64 will not reset before it shall have counted pulses from clock 44 sufficient in number so that the signal on lines 68, heretofore low, goes high. At this point in time, line 66 remains low. However, the inverter will invert the low signal along line 66 to a high so that the output of NAND gate 70 goes low. The low along line 56 likewise is inverted at the control input of OR gate 54 to define the leading edge of a start pulse. Prior to generation of the leading edge of the start pulse, the signal along lines 66, 68 were low, and through operation of inverter 74, the output of NAND gate 70 was high Counter 64 will continue to count until the output along lines 66 goes high also. The high on each of lines 66, 68 comprise the input at the respective control input terminals of AND gate 72 thereby to provide, through OR gate 62, a reset pulse to reset the counter. According to a preferred embodiment, the output along line 66 may be inverted by inverter 74 to terminate the start pulse as the output of NAND gate 70 goes high. Without any intent to limit the invention to operations occurring within certain time frames, but rather to describe a time frame which has been employed successfully, it may be considered that the counting operation will be completed within the period of about 1 second and that the operation is repeated until the start pulse results in movement of the balance wheel 16 which is brisk enough to develop reset pulses to AND gate 60 before counter 64 is able to count a sufficient number of pulses to initiate a start pulse. Within this criteria, brisk movement of the balance will result in the development of reset pulses at a rate of at least 1 p/sec.

Having described the invention with particular reference to the preferred form thereof, it will be obvious to those skilled in the art to which the invention pertains after understanding the invention that various changes and modifications may be made therein without departing from the spirit and scope of the invention as defined by the claims appended hereto.

I claim:

1. In combination with a timepiece: a single-coil including a winding serving as a pick-up coil and a drive coil; a mechanical movement; a movable system for driving said mechanical movement including a balance wheel formed by at least one plate and a magnetic member having a magnetic north pole and a magnetic south pole carried by each said plate; means mounting each said plate for movement rotationally about an axis adjacent said coil and parallel to the axis of a central region so that said magnetic field may sweep back and forth across said winding from a position approaching one outer edge, through said central region, to a position beyond the other outer edge to induce a voltage in said winding upon each back and forth sweeping movement; and a circuit having an input connected to said coil responsive to said induced voltage, an output connected to said coil adapted to impress a feedback signal across said winding, a start signal generator connected to said output, means for generating a feedback signal substantially in synchronism with said induced voltage to which said circuit shall have responded to add energy to the movable system during the time that said balance wheel is sweeping at least at a minimum prescribed weight of movement and at the same time to provide a reset signal to reset said start signal generator to prevent generation of a start signal, said circuit further including a source of output oscillation, and a gate circuit controlled by said source of output oscillation to connect and disconnect said input and output.

2. The combination of claim 1 wherein said balance wheel is formed by a pair of plates and a pair of magnetic members, and wherein said members are disposed in facing relationship to sweep opposite faces of said winding to create a magnetic field across said coil.

3. The combination of claim 1 wherein said central region of said winding comprises an open air core.

4. The combination of claim 1 further comprising a comparator having a steady state output during the period of time that the value of said induced voltage is above a threshold value, said comparator connected to said input.

5. The combination of claim 4 wherein said source of output oscillation comprises a clock having an output frequency of at least twice the frequency of oscillation of said balance wheel, and wherein said clock controls both said gate circuit and a memory device which stores the output of said comparator in response to said induced voltage.

6. The combination of claim 1 wherein said start signal generator repeatedly and sequentially generates said start signal either for self-start of said balance wheel or to increase the frequency of movement of said balance wheel to at least said prescribed rate whereby said circuit generates said feedback signal.

7. The combination of claim 1 wherein said start signal generator includes a counter, said counter connected to said source of oscillation and providing an output adapted for forming the leading edge of said start signal and an output forming the trailing edge of said start signal an increment of time thereafter if there is no feedback signal, and a second gate connecting said counter outputs to said feedback signal output.

8. The combination of claim 7 wherein said start signal generator includes a third gate connecting said counter outputs to a reset terminal of said counter to reset said counter immediately upon generation of said start signal.

9. The combination of claim 5 wherein said clock has an output frequency of at least 1 KHz.

10. A system comprising: a single-coil including a winding serving as a pick-up coil and a drive coil; a movable system including a balance wheel formed by at least one plate and a magnetic member having a magnetic north pole and a magnetic south pole carried by each said plate; means mounting each said plate for movement rotationally about an axis adjacent said coil and parallel to the axis of a central region so that said magnetic field may sweep back and forth across said winding from a position approaching one outer edge, through said central region, to a position beyond the other outer edge to induce a voltage in said winding upon each back and forth sweeping movement; and a circuit having an input connected to said coil responsive to said induced voltage, an output connected to said coil adapted to impress a feedback signal across said winding, a start signal generator connected to said output, means for generating a feedback signal substantially in synchronism with said induced voltage to which said circuit shall have responded to add energy to the movable system during the time that said balance wheel is sweeping at least at a minimum prescribed rate of movement for driving a mechanical movement and at the same time to provide a reset signal to reset said start signal generator to prevent generation of a start signal, and wherein said feedback signal generating means includes a gate circuit, a memory device and a source of output oscillation which controls said gate circuit to connect and disconnect said input and output.

11. The system of claim 10 wherein said balance wheel is formed by a pair of plates and a pair of magnetic members, and wherein said magnetic members are disposed in facing relationship to sweep opposite faces of said winding to create a magnetic field across said coil.

12. The system of claim 10 wherein said central region of said winding comprises an open air core.

13. A system comprising: a single-coil including a winding serving as a pick-up coil and a drive coil; a movable system including a balance wheel and magnetic means carried by said balance wheel for creating a magnetic field across said coil; means mounting said movable system for movement rotationally about an axis adjacent said coil and parallel to the axis of said core so that said magnetic field may sweep back and forth across said winding from a position approaching one outer edge, through a central region to a position beyond the other outer edge to induce a voltage in said winding upon each back and forth sweeping movement; and a circuit having an input connected to said coil responsive to said induced voltage, an output connected to said coil adapted to impress a feedback signal across said winding, a start signal generator connected to said output, means for generating a feedback signal substantially in synchronism with said induced voltage to which said circuit shall have responded to add energy to the movable system during the time that said balance wheel is sweeping at least a minimum prescribed rate of movement for driving a mechanical movement and at the same time to provide a reset signal to reset said start signal generator to prevent generation of a start signal, and wherein said feedback signal generating means includes a gate circuit, a memory device and a source of output oscillation which controls said gate circuit to connect and disconnect input and output.

14. The system of claim 1 in combination with a timepiece including a mechanical movement and wherein said movable system includes drive means for driving said mechanical movement.

* * * * *